(12) United States Patent
Beatty et al.

(10) Patent No.: US 8,060,474 B2
(45) Date of Patent: Nov. 15, 2011

(54) BACKING UP AND RESTORING SECURITY INFORMATION FOR SELECTED DATABASE OBJECTS

(75) Inventors: Louis Beatty, Ormond Beach, FL (US); Steven R. DeVos, Kirkland, WA (US); Deepak Saraf, Windermere, FL (US)

(73) Assignee: Symantec Operating Corporation, Mountain View, CA (US)

( * ) Notice: Subject to any disclaimer, the term of this patent is extended or adjusted under 35 U.S.C. 154(b) by 374 days.

(21) Appl. No.: 12/242,136

(22) Filed: Sep. 30, 2008

(65) Prior Publication Data

US 2010/0082552 A1    Apr. 1, 2010

(51) Int. Cl.
 *G06F 17/00* (2006.01)
(52) U.S. Cl. ........ 707/640; 707/609; 707/791; 707/802; 707/821
(58) Field of Classification Search ........... 707/600–831
 See application file for complete search history.

(56) References Cited

U.S. PATENT DOCUMENTS

| | | | |
|---|---|---|---|
| 6,564,215 B1 | 5/2003 | Hsiao et al. | 1/1 |
| 7,200,621 B2 | 4/2007 | Beck et al. | 707/661 |
| 7,398,529 B2* | 7/2008 | Prabakaran et al. | 719/316 |
| 7,418,619 B1 | 8/2008 | Uhlmann et al. | 714/2 |
| 7,694,103 B1 | 4/2010 | Kushwah | 711/171 |
| 2004/0113943 A1 | 6/2004 | Cooper et al. | 345/744 |
| 2004/0204949 A1 | 10/2004 | Shaji et al. | 705/1 |
| 2005/0138087 A1 | 6/2005 | Beck et al. | 707/204 |
| 2005/0216788 A1 | 9/2005 | Mani-Meitav et al. | 714/6 |
| 2008/0034039 A1 | 2/2008 | Cisler et al. | 709/204 |

FOREIGN PATENT DOCUMENTS

| | | |
|---|---|---|
| EP | 1 693757 | 8/2006 |
| WO | WO 01/06366 | 1/2001 |
| WO | WO 2004/086226 | 10/2004 |
| WO | WO 2005/066839 | 7/2005 |
| WO | WO 2007/088084 | 8/2007 |

OTHER PUBLICATIONS

Beatty, Louis J. and Steven R. DeVos; U.S. Appl. No. 11/960,309, filed Dec. 19, 2007; entitled "Techniques for Recovery of Application Level Objects."
Louis Beatty et al., "Backing Up and Restoring Selected Versioned Objects From a Monolithic Database Backup," U.S. Appl. No. 12/242,079, filed Sep. 30, 2008, Specification pp. 1-26 and Drawings pp. 1-7.
Louis Beatty et al., "Restoring Selected Objects From a Monolithic Database Backup," U.S. Appl. No. 12/242,014, filed Sep. 30, 2008, Specification pp. 1-23 and Drawings pp. 1-6.

* cited by examiner

*Primary Examiner* — Isaac M Woo
(74) *Attorney, Agent, or Firm* — Campbell Stephenson LLP

(57) ABSTRACT

A mechanism to selectively restore portions of a monolithically backed up database, while maintaining security relationships associated with the restored portions of the database is provided. Embodiments of the present invention provide a method, system and computer-readable storage medium for receiving a request to restore a selected object from among a plurality of backed up objects in a database backup, accessing security-related information associated with the selected object in the database backup, restoring the selected object using the information associated with the selected object in a target area, and associating elements of the security-related information with the restored selected object.

20 Claims, 8 Drawing Sheets

BACKING UP AND RESTORING SECURITY INFORMATION FOR SELECTED DATABASE OBJECTS

FIELD OF THE INVENTION

The present invention relates to a field of computer backups and restoration, and particularly to a method and system for selectively restoring objects from a monolithic database backup while maintaining associated security relationships for the restored objects.

BACKGROUND OF THE INVENTION

An ever-increasing reliance on information and the computing systems that produce, process, distribute, and maintain such information in its various forms, continues to put great demands on techniques for storing, backing up, and restoring such information. As businesses adopt techniques for centralizing information resources across an enterprise to enable collaboration and document management, storage, backup and restoration of such information becomes even more critical to the functioning of the enterprise.

In a typical enterprise-level collaboration and document-management platform, data from one or more user-oriented application objects can be stored in a centralized storage object such as a database. The database maintaining the data from the variety of application objects can be configured to maintain data relationships, or hierarchies, imposed by the application objects. The database can further have associated security relationships that permit users and/or groups to access application objects. Any backup and restoration scheme for such a database must maintain the relationships and hierarchies of the data created by the application objects as well as the security associated with those objects.

Traditional methods of backing up and restoring such a database are both personnel and resource intensive. For example, given that there are a multitude of application object-based areas in the database, a backup administrator would be responsible for knowing and selecting those portions of the database that are necessary to protect. Such an up-front, granular approach to data protection requires that the backup administrator, who may not be the database administrator, know the topology of the database in order to build a protection schema for a particular application object. Further, any changes made to the hierarchical object structure for an application would need to be taken into account by the backup administrator upon occurrence of those changes. This traditional backup approach is called a granular backup scheme because the areas in the database associated with each application object are backed up separately. Under a granular backup scheme, restoration of data related to a particular application object can be reasonably targeted because each application object has its own set of backups.

An alternate method of backup is to backup the entire database monolithically. A traditional method of restoring data from such a monolithic backup of the database is to restore the entire database snapshot to a temporary area and then select the desired information from the database to include in an active target database. Drawbacks of such a back-end method of data selection are that it takes time to restore all the data from a database backup from which the desired information would then be selected and disk resources are consumed by the temporary copy of the database.

It is therefore desirable to have a mechanism that realizes the efficiency of monolithically backing up the entire database, thereby not requiring that a backup administrator be familiar with the structure of the database being backed up. It is also desirable that a user be able to selectively restore portions of the backed up database when desired so as to speed recovery time. It is further desirable that any security provisions associated with the selectively restored portions of the backed up database be maintained and applied to those restored portions of the database.

SUMMARY OF THE INVENTION

Embodiments of the present invention provide a mechanism to selectively restore portions of a monolithically backed up database, while maintaining security relationships associated with the restored portions of the database. Embodiments of the present invention provide a method, system and computer-readable storage medium that provides a mechanism for receiving a request to restore a selected object from among a plurality of backed up objects in a database backup, accessing security-related information associated with the selected object in the database backup, restoring the selected object using the information associated with the selected object in a target area, and associating elements of the security-related information with the restored selected object.

Aspects of the above embodiments use database table metadata gathered from the backed up database at the time the backup was created in order to locate the security-related information associated with the selected object in the database backup. Further aspects of the present invention generate a security code associated with the selected object using one or more elements of the object's security-related information and derive security-related information for the restored object from the security code. Another aspect of the present invention, selects one or more elements of the security-related information for association with the restored object and can perform such selection by determining a level of a hierarchy with which the selected object is associated and security information related with that level of the hierarchy.

The foregoing is a summary and thus contains, by necessity, simplifications, generalizations and omission of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a mechanism for selectively restoring application object data from a monolithic backup of a database storing the application object data. Embodiments of the present invention provide this capability by identifying, at the time of the database backup, metadata stored in the database that describes the application object data, structures that the application object data is stored within, interrelationships between those structures, and security provisions associated with the structures. Embodiments of the present invention can store information regarding this metadata to be used during restore operations. During a restore operation, embodiments of the present invention can access the stored information related to the metadata and use that information to directly access the metadata within the database backup. Embodiments of the present invention use the accessed metadata to provide a description of the data backed up from the database and the relationships between such data (e.g., a hierarchy of data structures) to a user restoring data. Embodiments of the present invention can further access data selected from such a description from the database backup and restore that information within a target database. Embodiments of the present invention can also access security-related information associated with the selected data and restore that information, as needed. In this manner, a database comprising data from one or more application objects can be efficiently backed up in a monolithic fashion, and then be efficiently restored in a targeted fashion. Further, personnel resources are more efficiently utilized in that a backup administrator need not be familiar with the structure of a database being backed up, leaving structural familiarity to a person restoring a specific set of data.

Figure 1:
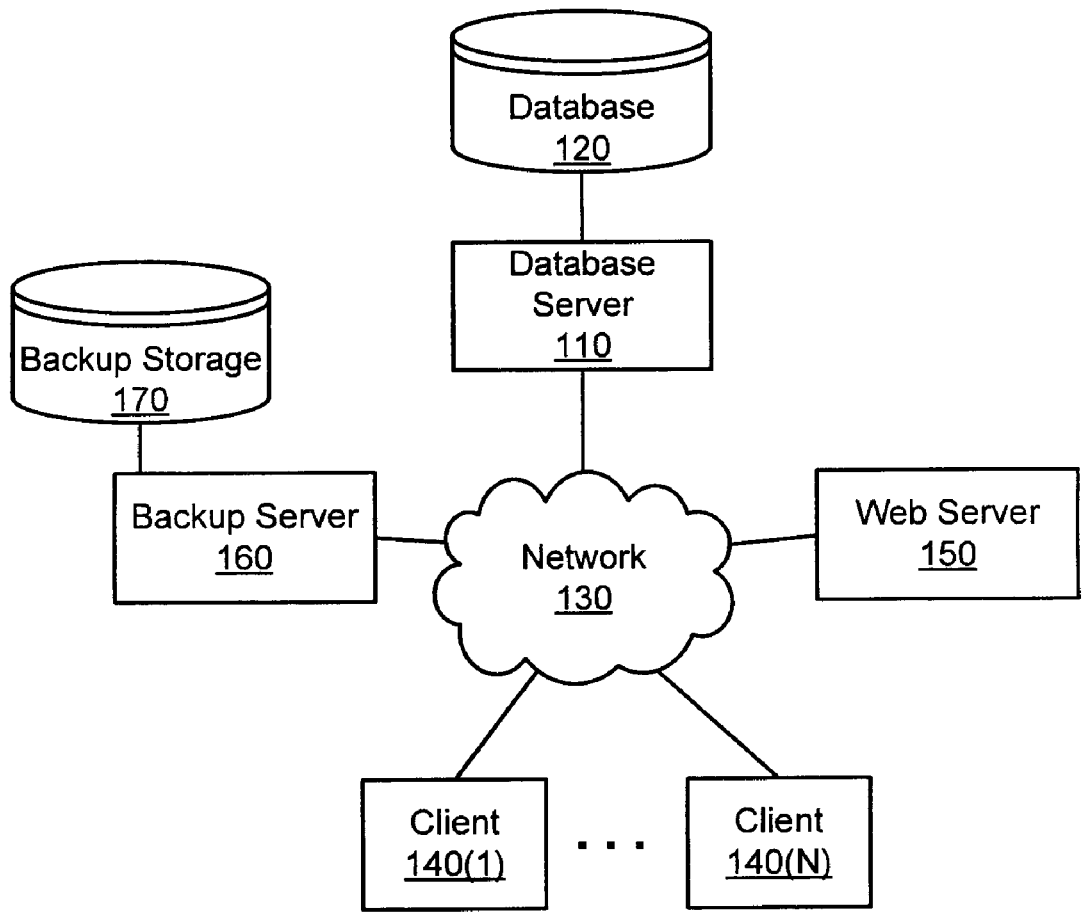
FIG. 1 is a simplified block diagram illustrating an example of a network configurable to employ embodiments of the present invention.

FIG. 1 is a simplified block diagram illustrating an example of a network configurable to employ embodiments of the present invention. A database server 110 is coupled, directly or indirectly, to storage volumes storing a database 120. Database 120 can be accessed by one or more application objects that store data in database 120. Database server 110 is coupled to a network 130 that provides access to and from the database server. Network 130 is typically an enterprise-level network for an organization, and can include, without limitation, local area networks, metro area networks, wide area networks, and the like. Network 130 can be supported by standard networking hardware and protocols, including, for example, ethernet routers, optical cabling, and the like. Network 130 can also couple computer equipment in one or more locations of an enterprise (e.g., clients 140(1)-(N)), thereby providing communication from those clients to database server 110.

The network illustrated in FIG. 1 is also coupled to web server 150. Web server 150 can provide user access to an application associated with one or more application objects. Network 130 can have one or more web servers 150 each providing a separate application or multiple web servers distributing the same application. Web server 150 provides an application object model to access data stored in database 120 by communicating with database server 110. Such communication between web server 150 and database server 110 can be via an application program interface (API) shared by the application objects served by web server 150 and database server 110.

A backup server 160 is coupled to network 130 and is configured to store backup images of data stored on network 130 in one or more backup storage volumes 170. Backup server 160 can be configured to run a variety of types of backup utilities that provide snapshots of data on the network at the time the backup is performed. Backup server 160 can, for example, backup a database 120 by directly accessing the data via database server 110. In this manner, a full monolithic backup of database 120 can be performed via the database server's SQL interface without regard to the specific data structures stored within the database. Alternatively, if a specific portion of database 120 is desired to be backed up, backup server 160 can access a particular application object's data via the associated application's web server 150. In this manner, a granular backup of a particular application object stored in database 120 can be performed.

A downside to performing a granular backup, as described above, is that the resources of web server 150 associated with the particular application are consumed. This consumption of web server resources can slow or halt access to the served application during the time of backup. By directly backing up the database via database server 110, consumption of web server resources is avoided. But, in a traditional backup scheme, restoration of specific application object data can then only be performed by restoring the entire database and then selecting data from that restored database. Such a restore and selection operation consumes both time and physical resources (e.g., disk space required to store the fully restored backup).

Figure 2:
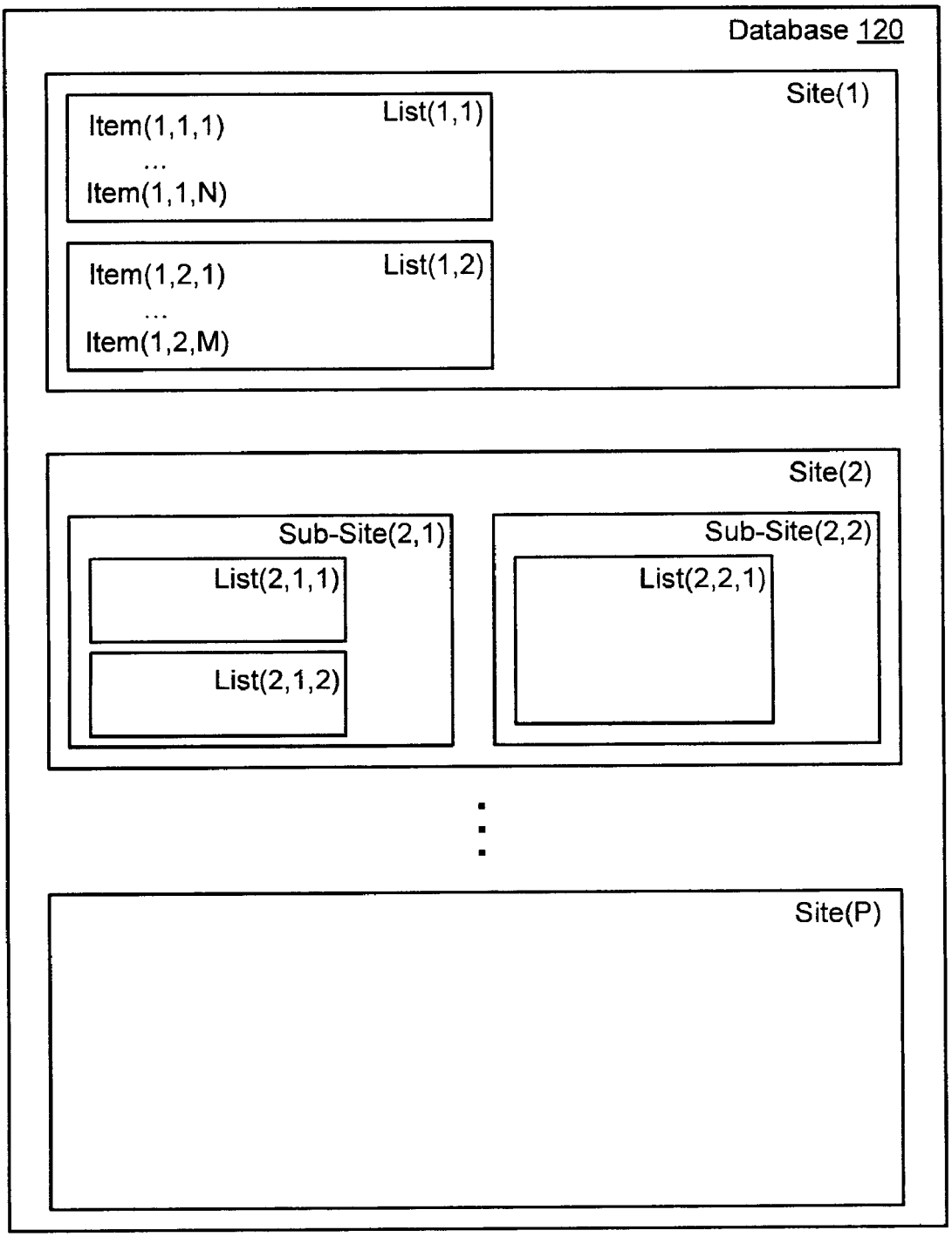
FIG. 2 is a simplified block diagram illustrating an example of an object layout within a database that is usable in conjunction with embodiments of the present invention.

FIG. 2 is a simplified block diagram illustrating an example of an object layout within a database 120 that is usable in conjunction with embodiments of the present invention. Database 120 contains one or more containers labeled Site (1)-(P). Each Site can be associated with a specific application. Each Site is therefore an application object having a unique set of characteristics defined by the Site's association with a particular application. A Site can have, for example, an associated URL, a unique identifier, an owner identifier, associated security information, associated disk quotas and disk usage information, and the like. One or more Sites can be associated with a particular application, depending on the nature of the application.

Sites can be associated with other containers. For example, Site(2) includes two Sub-Site containers: Sub-Site(2,1) and Sub-Site(2,2). Each Sub-Site can include associated information describing the Sub-Site, as described above for a Site. While each Sub-Site is associated with the parent Site, the Sub-Sites themselves are disjoint objects.

Sites and Sub-Sites can further contain other application objects. An example of one such application object is a List, which is also a container. FIG. 2 illustrates Site(1) having associated List objects (e.g., List(1,1) and List(1,2)). Sub-Site (2,1) also has associated Lists (e.g., List(2,1,1) and List(2,1, 2)). On the other hand, Sub-Site(2,2) has a single List (e.g., List(2,2,1)). List objects can also have associated information that can include, for example, an identifier of the site to which the List belongs, a name of the List, creation date and time information, security information, a type of the List (e.g., the type of information stored within the List), and the like. In addition to such characteristics directly associated with a List, a List can also inherit characteristics associated with a Site and/or a Sub-Site containing the List. Thus, for example, a List can acquire security protections associated with a Site with which the List is associated.

As illustrated in FIG. 2, a List can contain associated items or data objects. Each List can be associated with a specific type of item. Item objects can have associated characteristics such as an identifier associating the item with a particular List and/or Site, an identifier of a user who entered or modified the item, the type of data associated with the item, and a value of the item object. Again, an item can also inherit characteristics of a List to which the item belongs and/or a Site or Sub-Site with which the item is associated.

A database 120 can not only store the containers and their associated data, but also metadata descriptions of the containers and their associated data, including their interrelationships. A database 120 can store such metadata in tables associated with Lists, items, Sites, and Sub-Sites, and the like. Indeed, a separate metadata table can be provided for each type of application object stored within database 120.

An example of a system using a database as described, is Microsoft®'s SharePoint® application. While embodiments of the present invention are not limited to use in conjunction with SharePoint® databases, embodiments of the present invention can be used with SharePoint® databases and examples will be provided below using SharePoint® terminology. It should be understood that the use of such terminology is not meant to be limiting, and embodiments of the present inventions can be used with a variety of applications that store data in objects in a database environment.

It should be further noted that the relationship between Sites, Sub-Sites, Lists and items is a hierarchical relationship. As discussed above, child objects within an application object hierarchy can inherent characteristics of parent objects. Further, using the container analogy discussed above, a child container object such as a List is contained within a parent Sub-Site or Site. Thus, in order to restore the child object to a target database, any parent objects that are not already restored must first be restored in order for the child object to be properly and completely restored within the target database. This allows the child to both be properly placed in the hierarchy and to inherit characteristics from the child's parent objects.

Backing Up Application Objects

Figure 3:
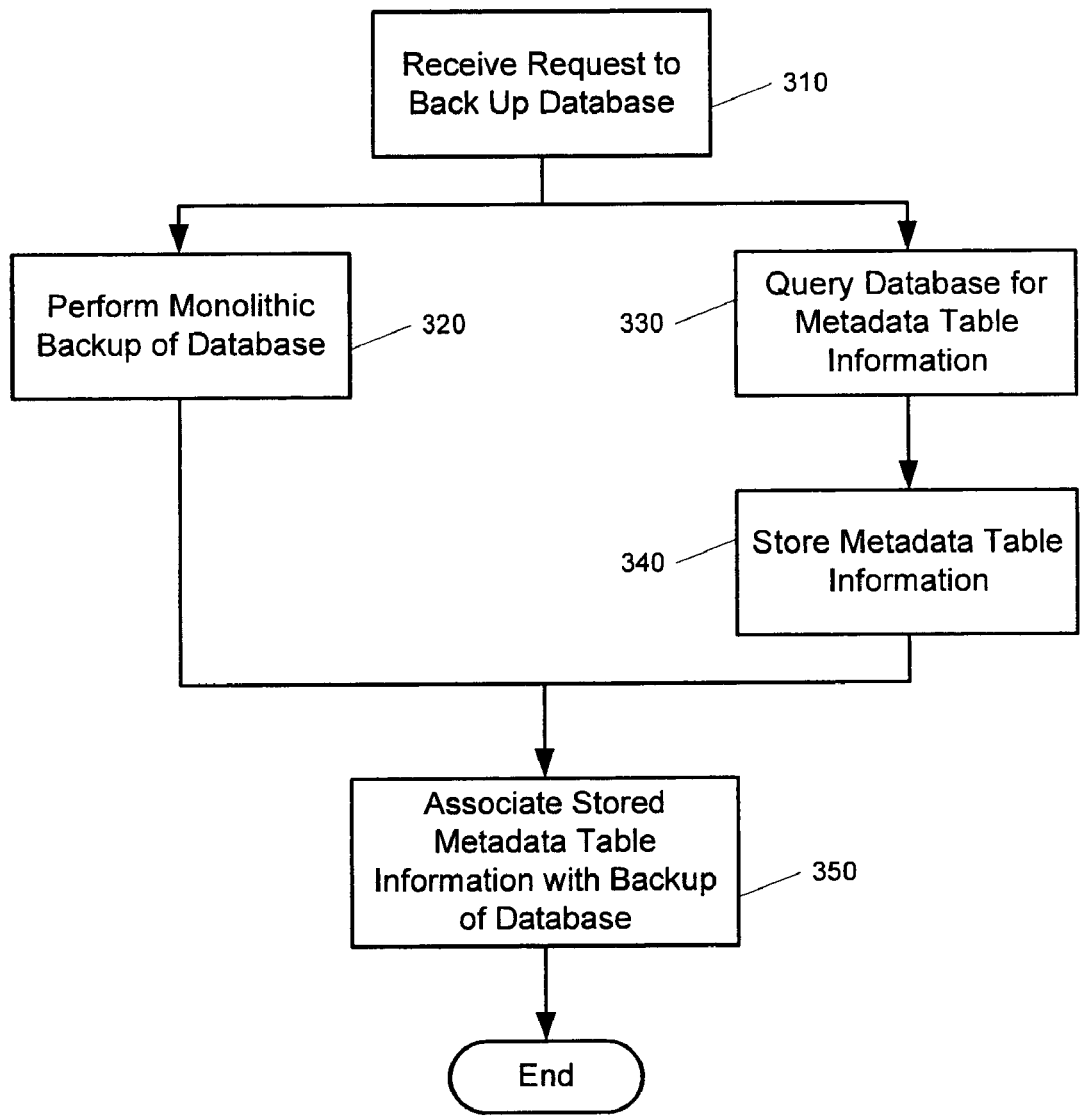
FIG. 3 is a simplified flow diagram illustrating a backup process in accord with embodiments of the present invention.

FIG. 3 is a simplified flow diagram illustrating a backup process in accord with embodiments of the present invention. A backup server 160 can receive a request to backup a database 120 (310). At this point, two processes are initiated. These processes can occur concurrently or sequentially but close enough in time that structures with database 120 are the same. A monolithic backup of the database is performed (320). Such a backup can be a snapshot of database 120 including all the information related to that database at the time of backup. The monolithic backup is performed using a direct interaction between the backup server and the database server. The backup is not performed using the application object model supplied by, for example, web server 150.

Additionally, database 120 can be queried for metadata table information (330). Metadata table information includes information about the tables containing the characteristics of the various object structures within database 120. Table information that is sought can include, an index of the table, an offset of the table within the database (e.g., the location of the table), a name of the table, and a structure of the table. In this manner, information is gathered that identifies and locates each table describing an object of interest within database 120.

Embodiments of the present invention gather this metadata table information so that the tables can be accessed upon restore operations. Thus, sufficient information to allow such metadata table access is gathered, but not the information actually stored within the tables themselves. Once the metadata table information is gathered, the metadata table information can be stored (340). Such storage can take the form, for example, of a list of tables. An example of a utility that can perform such access and storage of metadata table information is described in pending U.S. patent application Ser. No. 11/960,309, entitled "Techniques for Recovery of Application Level Objects," which is incorporated by reference for all that it discloses.

Once the backup is complete and the metadata table information has been stored, the metadata table information is associated with the backup of the database (350). Such an association enables access to the stored list of metadata table information during restore operations.

Restoring Selected Application Objects

Figure 4:
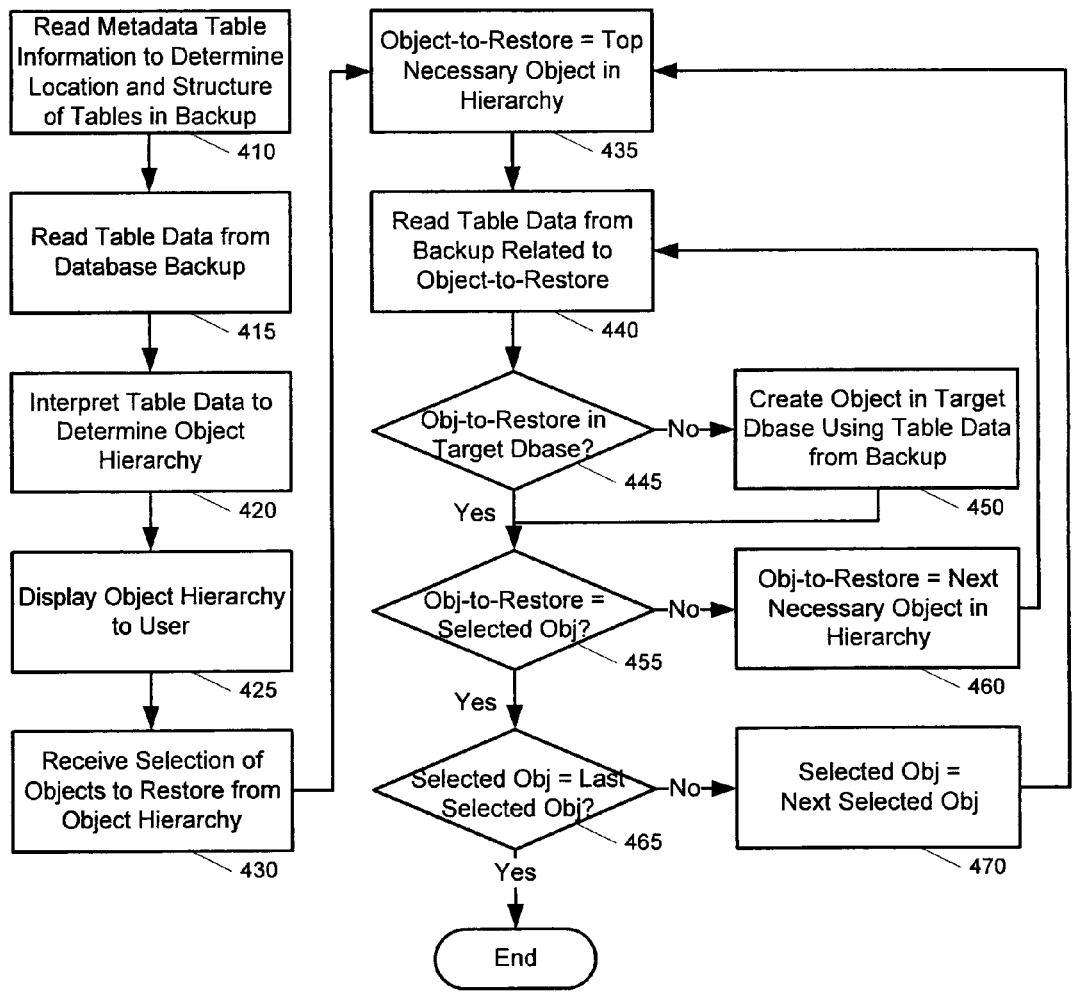
FIG. 4 is a simplified flow diagram illustrating a database restore operation in accord with embodiments of the present invention.

FIG. 4 is a simplified flow diagram illustrating a database restore operation, in accord with embodiments of the present invention. In response to a user request to restore application object information from a specified backup, a restore utility can read metadata table information associated with the specified backup to determine locations and structures of tables describing application objects in the backup (410). The restore utility can then use the information from the metadata table's information to read the table data directly from the backup (415). Once the table data has been read, that data can then be interpreted to determine a hierarchy of application objects within the database backup (420). The interpreted object hierarchy can then be displayed to a user (425). The user can then review the displayed object hierarchy to determine those objects that the user wishes to restore. A user can select an object at any level of the hierarchy.

Once the user selects the desired objects for restore, the restore utility can receive the object selections (430). At this point, the restoration utility begins restore operations to restore all the objects in the hierarchy necessary to restoring each selected object. For example, if a List object is selected, then any Site or Sub-Site objects with which the List object is associated are also subject to restore operations. As discussed above, this is because a List object, as a child of a Site object, inherits certain characteristics of the parent object. Thus, the restoration utility goes through a series of steps to restore the hierarchy.

Thus, the top object in a hierarchy necessary to restore a selected object becomes the first object to restore (435). The restore utility reads metadata table data from the backup related to the object-to-restore (440). Again, information necessary to locating the appropriate metadata table or tables associated with the object-to-restore can be read from the metadata table information associated with the backup. Once the information related to the object-to-restore has been read from the table, a determination is made as to whether the object-to-restore is already present in the target database (445). If the object-to-restore is not already present in the target database, then the object-to-restore is created in the target database using the table data read from the backup (450). Restoration of the object-to-restore can be performed by supplying the object-related information to an application object model served by, for example, web server 150. By using the application object model to generate the object-to-restore in the target database, consistency of structures with their associated application is ensured.

Subsequent to creating the object in the target database or determining that that object has already been restored, a determination is made as to whether the object-to-restore is the same as the object selected for restore by the user (455). If the object-to-restore is not the object selected by the user, then a next object-to-restore is selected which is a next object in the hierarchy necessary to restoring the selected object (460). Then, processing returns once again to reading the table data from the backup related to the new object-to-restore (440) and the process repeats as described above.

If the object-to-restore was the object selected by the user (455), then a determination is made as to whether the selected object was the last selected object by the user (465). That is, a determination is made as to whether each object selected by the user has now been restored. If not, then the next selected object is targeted for restore and the process returns to a determination of the top object in the hierarchy necessary to restore the next selected object (435), and the process repeats as described above. If the selected object was the last object selected by the user (465), then the restoration process is complete.

By using the restoration method described above, an entire hierarchy necessary to support a selected object within a backed up database can be restored to a target database. In addition, all the characteristics of that object are restored by accessing the tables stored within the database backup that contain the characteristics necessary to describe the requested object. If an object needs to be created in the target database (e.g., step 450), the restore utility can access an application web server 150 associated with the object to create the object in the target database using the characteristics information pulled from the backup table. In this manner, the structures necessary for the application to access the object can be created automatically by the application object model and, at the same time, the necessary characteristics information describing the object are provided from the backup.

Using such a restore technique, containers can be created within the target database that have the same characteristics as the associated containers in the backed up database. A user could therefore create a structure within a target database that is the same as that in the backed up database, but which can be available for data other than that which was stored in the backed up database. That is, the backed up database serves as a template for the target database. Data can also be restored from the backed up database to the target database. Once the appropriate containers have been configured in the target database, a direct access to the database server can be made between database server and the backup server for a more rapid and efficient restoration of data to the appropriate structures in the target database, if desired.

Backing Up and Restoring Security-Related Information

An application object database can have security associated with the various application objects stored in a database. For example, an administrator of a database may want to restrict certain users from accessing specific content in the database. Alternatively, the database administrator may want to restrict certain users or groups of users from modifying content, while still allowing those users access to content in a particular Site, Sub-Site, List or even items. An example of an application object database having such a security scheme is the Microsoft® SharePoint® system. The below discussion related to the control of such a security scheme uses examples from a SharePoint® configuration, but it should be understood that embodiments of the present invention for backing up and restoring associated security information are not limited to a SharePoint® database.

Figure 5:
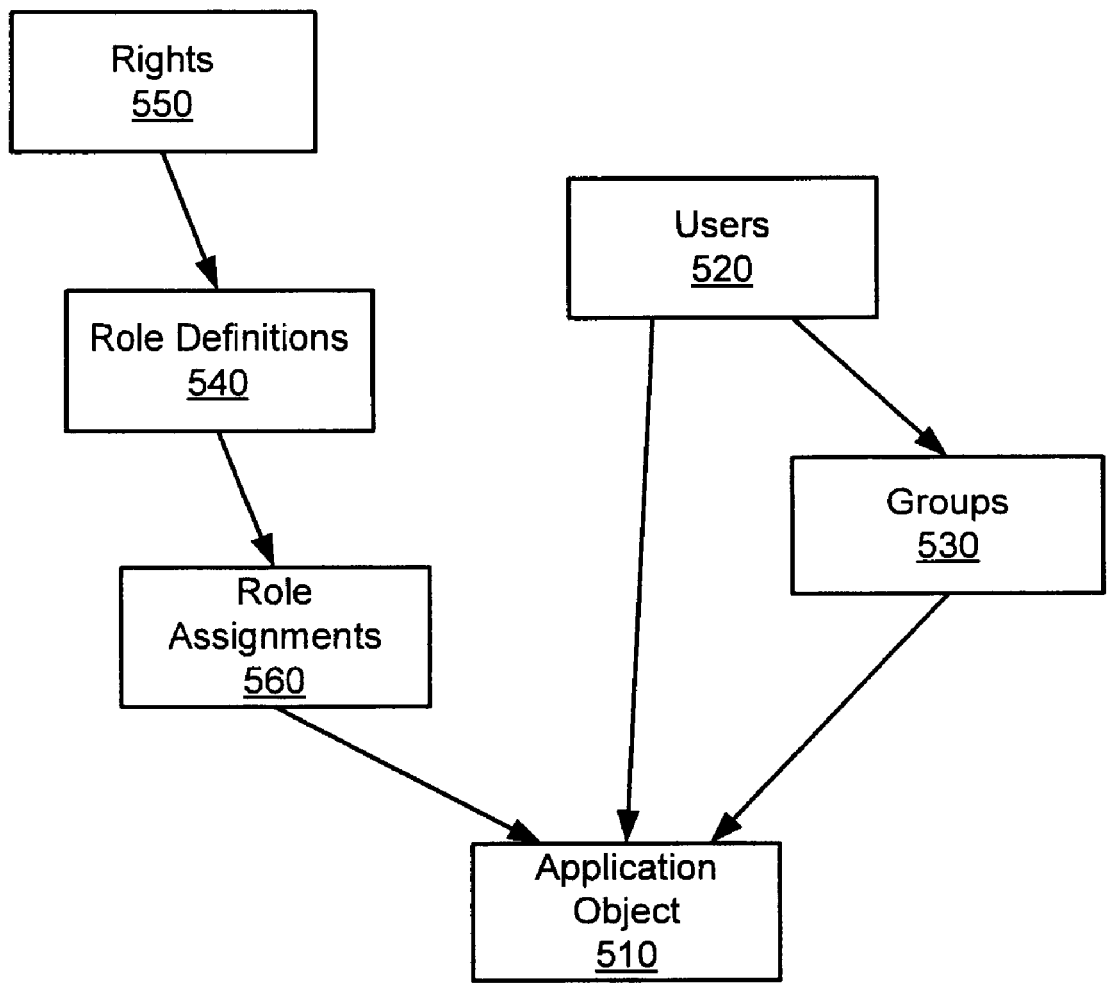
FIG. 5 is a simplified block diagram illustrating relationships between security-related objects usable to control access to application objects in a database usable in conjunction with embodiments of the present invention.

FIG. 5 is a simplified block diagram illustrating relationships between security-related objects usable to control access to application objects in a database 120. An individual user can gain access to an application object 510 directly as an individual or indirectly as a member of a group. Database 120 can maintain information about identities of users through a user object 520. Such a user object can include a unique identifier for each user and other information related to the users (e.g., logon name, display name, and email address). In a SharePoint® database, for example, information associated with user object 520 can be stored in the UserInfo table.

Group object 530 stores information related to user groups that are defined to have access to an object 510. A group is a collection of users that are managed in the same manner for security purposes, wherein each member of the group has the same type of access to object 510. Group object 530 provides a listing of groups that includes, for example, an identifier for the group and a listing of user members of a group. Additional information that can be associated with group object 530 can be, for example, a title of the group, a description of the group, an owner identifier for the group (e.g., a user who can modify group membership), and the like. In a SharePoint® database, for example, information associated with group object 530 can be stored in a Groups table and a GroupMembership table. FIG. 5 shows a relationship between users object 520 and groups object 530 because information related to the members of a group can be pulled from the user's object.

A variety of schemes can be used to grant access rights to an object 510 to an individual user or a group of users. One method can be to associate rights identifiers individually to a user or a group of users, thereby granting that right to the user or group of users. But often a set of rights to an object often accompany one another as a bundle of rights. Thus, another method to assign rights to a user or group of users is to identify the collection of rights as a bundle, or role, and assign that bundle to a user or group of users. FIG. 5 illustrates the latter approach, which is also adopted by Microsoft's® SharePoint® database.

Role Definition object 540 contains a listing of Role definitions. A Role definition is a list of rights associated with an identified Role. Rights object 550 contains information related to all rights that are available to be assigned to users or groups. Role definitions are a collection of rights that can be bound to a specific application object and are specifically scoped to a particular object. Examples of Roles can include, full control, read, contribute, design, or limited access. If a Role definition is assigned to a parent object within a hierarchy (e.g., a Site), then that Role definition applies for all children of that object in the hierarchy. Thus, a Role definition can be inherited by a child from the parent. But, the Role definition need not be the same for objects in the database that do not have a child relationship.

Role Assignment object 560 defines a relationship between a Role definition and users or groups. Each Role definition can be used in multiple Role assignments (e.g., readers on a List 1 and readers on a List 2 may be different, but their Role assignment can share a single Role definition). Through the use of Role assignments, meaningful collections of rights (Role definitions) that are well defined and consistent are assigned to users or groups, rather than assigning individual rights to a user or a group.

A database can store information related to Role Definition 540, Rights 550 and Role Assignment 560 objects in a variety of interrelated tables. A SharePoint® database, for example, can store such information in a Roles table and a RoleAssignment table. To track the rights that users or groups have on a specific object 510, the object can have an associated access control list (ACL). An ACL can include an access control entry for each user and group having access to the object. Each access control entry can have an identifier for the associated user or group, as well as identifiers associated with the access control entry's Role assignments. Further, an access control list will have specific rights, Role definitions, and Role assignments structured therein so that database security is properly implemented for the object. While objects in a hierarchy can inherit security permissions from a parent object, as stated above, an object can alternatively have a defined set of permissions that are distinct from the parent container.

Since security is an integral part of the proper functioning of an application object database, as described above, backup and restore operations should maintain security relationships. Embodiments of the present invention provide maintaining security relationships by accessing and storing database metadata table information that provides security-related information, as discussed above with regard to FIG. 3. Such security-related information is stored in association with a backup of the database and is accessed and provided to a target database upon restore.

Figure 6:
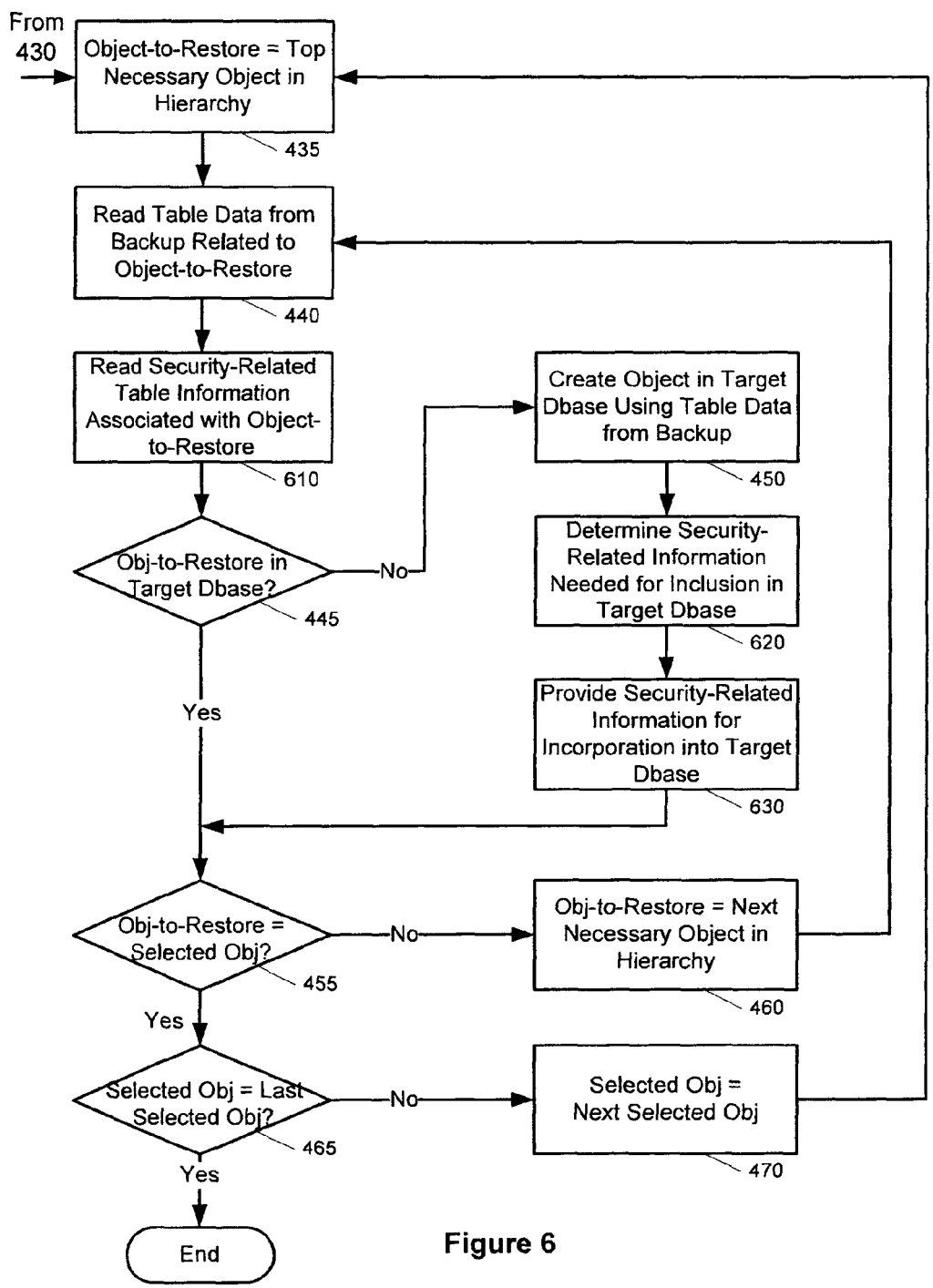
FIG. 6 is a simplified flow diagram illustrating a portion of a database restore operation that provides security information associated with an object being restored, in accord with embodiments of the present invention.

FIG. 6 is a simplified flow diagram illustrating a portion of a database restore operation that provides security information associated with an object being restored, in accord with embodiments of the present invention. FIG. 6 illustrates additional operations occurring to restore security-related information along with the operations already discussed in association with and illustrated in FIG. 4. FIG. 6 begins with step 435 from FIG. 4. It should be understood that steps 410-430, illustrated in FIG. 4, would still be performed prior to step 435 in order to provide for selection of a desired application object to restore, but for the clarity's sake FIG. 6 includes steps 435 and subsequent. In addition, FIG. 6 illustrates access of security information and providing that security information when creating the object in the target database.

As discussed with regard to FIG. 4, the top object in a hierarchy necessary to restore an object selected in step 430 becomes the first object-to-restore (435). The restore utility reads metadata table data from the backup related to the object-to-restore (440). The restore utility also reads security-related metadata table information related to the object-to-restore (610). Again, information necessary to locating the appropriate metadata table or tables associated with the security-related information is read from the metadata table information associated with the backup.

Security-related information is gathered from tables that store security-related information associated with the various objects in the database (e.g., the objects illustrated in FIG. 5) as appropriate for the object-to-restore. Once the security-related information is gathered from the various tables within the database, a security code or identifier can be generated for the object-to-restore stored in the database. The security code or identifier can be a value that represents the rights that users and groups have on a given object as well as Role assignments that are structured specifically for that object. Alternatively, security-related information associated with the object-to-restore can be temporarily stored in preparation for restore to the target database.

Once the security-related information associated with the object-to-restore is gathered, the object-to-restore can be created in the target database using the table data from the backup (450), as described above with regard to FIG. 4. An analysis can then be performed to determine the security-related information that needs to be included in the target database. For example, if the object-to-restore is at a top-level in the hierarchy (e.g., a Site), then security information will be restored to include user and group identifiers, as well as other security-related information associated with the site. On the other hand, if the object-to-restore is lower in the hierarchy but is being placed within an already existing hierarchy, then certain security-related information may not be restored. For example, user information that is not already associated with a related Site for a List object-to-restore will not be restored for the List, but will instead by discarded. A validation process can be performed to determine the existence and correlation of users and/or groups in the target database. Such a validation process can use unique identifiers associated with the users and groups in the target database and the backed up database. The security-related information can be interpreted from, for example, the generated security code or the temporarily stored security-related information.

Once a set of needed security data is identified, the security-related information associated with the restored object-to-restore can be provided for incorporation into the target database (630). One mechanism for creating the object and incorporating the security-related information is to use the object model of the database provided by a web server 150. In this manner, the object-related information and the security-related information can be incorporated into the database in a manner that is appropriately formatted and applied for the given application object. Once the object and its security-related information have been provided to the target database, the restoration process illustrated in FIG. 4 proceeds at process block 455-470, as discussed above with regard to FIG. 4.

The above-described backup and restore operations provide a mechanism by which security-related information can be directly extracted from an application object database (e.g., database 120) during a backup operation of that database, without burdening an application web server 150 during the backup operation. Security-related information can then be stored for access during a restore operation of a selected object. By utilizing this information in conjunction with providing the information to an associated application web server, the security information can be incorporated in a manner useable by the application after restoration to a target database.

An Example Computing and Network Environment

As shown above, the present invention can be implemented using a variety of computer systems and networks. An example of one such computing and network environment is described below with reference to FIGS. 7 and 8.

Figure 7:
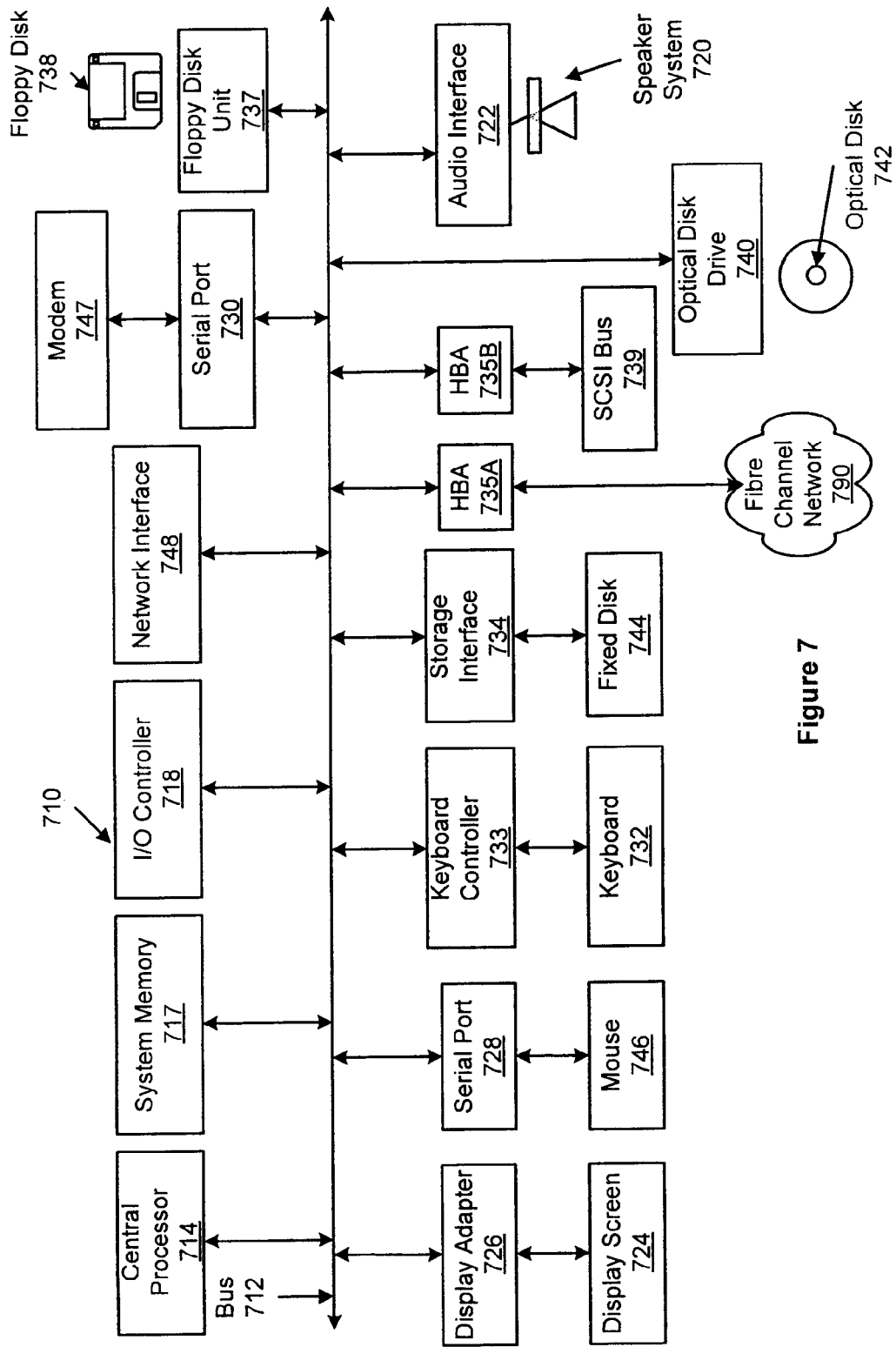
FIG. 7 depicts a block diagram of a computer system suitable for implementing embodiments of the present invention.

FIG. 7 depicts a block diagram of a computer system 710 suitable for implementing aspects of the present invention (e.g., clients 140, backup server 160, database server 110, and web server 150). Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer-readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer-readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present invention. The devices and subsystems can be interconnected in different ways from that shown in FIG. 7. The operation of a computer system such as that shown in FIG. 7 is readily known in the art and is not discussed in detail in this application. Code to implement the present invention can be stored in computer-readable storage media such as one or more of system memory 717, fixed disk 744, optical disk 742, or floppy disk 738. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
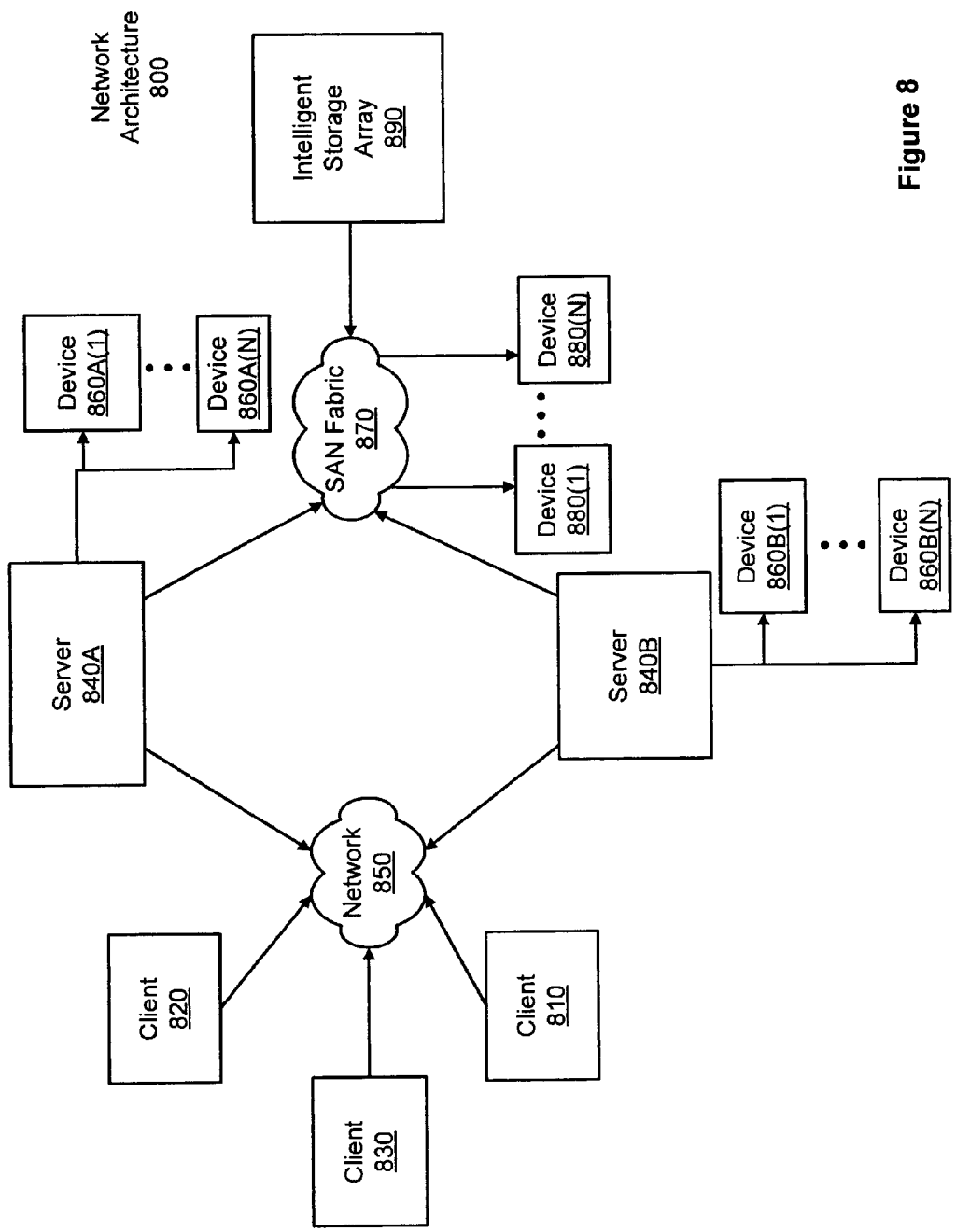
FIG. 8 is a block diagram depicting a network architecture suitable for implementing embodiments of the present invention.

FIG. 8 is a block diagram depicting a network architecture 800 in which client systems 810, 820 and 830, as well as storage servers 840A and 840B (any of which can be implemented using computer system 710), are coupled to a network 850. Storage server 840A is further depicted as having storage devices 860A(1)-(N) directly attached, and storage server 840B is depicted with storage devices 860B(1)-(N) directly attached. Storage servers 840A and 840B are also connected to a SAN fabric 870, although connection to a storage area network is not required for operation of the invention. SAN fabric 870 supports access to storage devices 880(1)-(N) by storage servers 840A and 840B, and so by client systems 810, 820 and 830 via network 850. Intelligent storage array 890 is also shown as an example of a specific storage device accessible via SAN fabric 870.

With reference to computer system 810, modem 847, network interface 848 or some other method can be used to provide connectivity from each of client computer systems 810, 820 and 830 to network 850. Client systems 810, 820 and 830 are able to access information on storage server 840A or 840B using, for example, a web browser or other client software (not shown). Such a client allows client systems 810, 820 and 830 to access data hosted by storage server 840A or 840B or one of storage devices 860A(1)-(N), 860B(1)-(N), 880(1)-(N) or intelligent storage array 890. FIG. 8 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 710). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof. For example, specific electronic components can be employed in an application specific integrated circuit or similar or related circuitry for implementing the functions associated with one or more of the described functional blocks.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules discussed herein may further include one or more sets of instructions executable by a processor configured to execute such instructions. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a request to restore a selected object from a backup of a database comprising a plurality of objects, wherein
      the plurality of objects comprises the selected object, and
      associated security-related information is associated with the selected object in the backup of the database;
   accessing the associated security-related information, wherein
      the associated security-related information is gathered from the backup of the database,
      the accessing comprises
         locating security-related information using database table metadata,
         the database table metadata is gathered from the backup of the database, and
         the security-related information comprises the associated security-related information;
   restoring the selected object as a restored selected object in a target database; and
   associating one or more elements of the associated security-related information with the restored selected object.

2. The method of claim 1, wherein the accessing the associated security-related information further comprises:
   reading the security-related information, wherein
      the database table metadata is gathered at the time the backup of the database is created.

3. The method of claim 2, further comprising:
   generating a security code associated with the selected object, wherein
      the security code is generated using one or more of the elements of the associated security-related information.

4. The method of claim 3, wherein the associating one or more elements of the associated security-related information with the restored selected object further comprises:
   deriving the associated security-related information from the security code.

5. The method of claim 1, wherein the associating the associated security-related information with the restored selected object further comprises:
   storing the associated security-related information using an object model of an application associated with the selected object.

6. The method of claim 5, wherein the object model comprises an application program interface (API).

7. The method of claim 1, further comprising:
   selecting the one or more elements of the associated security-related information for associating with the restored selected object.

8. The method of claim 7, wherein the selecting the one or more elements of the associated security-related information comprises:
   determining a level of a hierarchy of the target database in which the selected object is restored;
   identifying security-related information associated with the level of the hierarchy; and
   selecting the one or more elements of the associated security-related information corresponding to the security-related information associated with the level of the hierarchy.

9. A system comprising:
   a processor;
   a first storage object, accessible by the processor, wherein
      the first storage object is configured to store a backup of a database, and
      the backup of the database comprises
         a plurality of objects, and
         security-related information associated with the plurality of objects;
   a second storage object, accessible by the processor, wherein
      the second storage object comprises a target storage area, and
      the target storage area is configured to store objects restored from the backup of the database; and
   a memory, coupled to the processor, in which is encoded a set of instructions, executable by the processor and configured to receive a request to restore a selected object from the backup of the database, wherein
the plurality of objects comprises the selected object, and
associated security-related information is associated with the selected object in the backup of the database;
access the associated security-related information, wherein
the associated security-related information is gathered from the backup of the database,
the instructions configured to access the associated security-related information comprise instructions configured to
locate security-related information using database table metadata,
the database table metadata is gathered from the backup of the database, and
the security-related information comprises the associated security-related information;
restore the selected object to the second storage object as a restored selected object; and
associate one or more elements of the associated security-related information with the restored selected object.

10. The system of claim 9, wherein the instructions configured to access the associated security-related information further comprise instructions configured to:
read the security-related information, wherein
the database table metadata is gathered at the time the backup of the database is created.

11. The system of claim 10, wherein the memory further stores instructions configured to generate a security code associated with the selected object, wherein the security code is generated using one or more of the elements of the associated security-related information.

12. The system of claim 11, wherein the instructions configured to associate one or more elements of the associated security-related information with the restored selected object further comprise instructions configured to:
derive the associated security-related information from the security code.

13. The system of claim 9, wherein the memory stores instructions further configured to
select the one or more elements of the associated security-related information for associating with the restored selected object.

14. The system of claim 13, wherein the instructions configured to select the one or more elements of the associated security-related information further comprise instructions configured to:
determine a level of a hierarchy of the target database in which the selected object is restored;
identify security-related information associated with the level of the hierarchy; and
select the one or more elements of the associated security-related information corresponding to the security-related information associated with the level of the hierarchy.

15. A computer-readable storage medium comprising:
a first set of instructions, executable by a processor, and configured to receive a request to restore a selected object from a backup of a database comprising a plurality of objects, wherein
the plurality of objects comprises the selected object, and
associated security-related information is associated with the selected object in the backup of the database;
a second set of instructions, executable by the processor, and configured to access the associated security-related information, wherein
the associated security-related information is gathered from the backup of the database
the second set of instructions comprises
a first subset of instructions, executable by the processor, and configured to locate security-related information using database table metadata,
the database table metadata is gathered from the backup of the database, and
the security-related information comprises the associated security-related information;
a third set of instructions, executable by the processor, and configured to restore the selected object as a restored selected object in a target database; and
a fourth set of instructions, executable by the processor, and configured to associate one or more elements of the associated security-related information with the restored selected object.

16. The computer-readable storage medium of claim 15, wherein the second set of instructions further comprises:
a second subset of instructions, executable by the processor, and configured to read the security-related information, wherein
the database table metadata is gathered at the time the backup of the database is created.

17. The computer-readable storage medium of claim 16, further comprising:
a fifth set of instructions, executable by the processor, and configured to generate a security code associated with the selected object, wherein the security code is generated using one or more of the elements of the associated security-related information.

18. The computer readable storage medium of claim 17, wherein the fourth set of instructions comprises:
a third subset set of instructions, executable by the processor, and configured to derive the associated security-related information from the security code.

19. The computer-readable storage medium of claim 15, further comprising:
a fifth set of instructions, executable by the processor, and configured to select the one or more elements of the associated security-related information for associating with the restored selected object.

20. The computer-readable storage medium of claim 19, wherein the fifth set of instructions further comprises:
a sixth set of instructions, executable by the processor, and configured to determine a level of a hierarchy of the target database in which the selected object is restored;
a seventh set of instructions, executable by the processor, and configured to identify security-related information associated with the level of the hierarchy; and
an eighth set of instructions, executable by the processor, and configured to select the one or more elements of the associated security-related information corresponding to the security-related information associated with the level of the hierarchy.

* * * * *